(12) United States Patent
Graves et al.

(10) Patent No.: US 11,210,579 B2
(45) Date of Patent: *Dec. 28, 2021

(54) AUGMENTING NEURAL NETWORKS WITH EXTERNAL MEMORY

(71) Applicant: DeepMind Technologies Limited, London (GB)

(72) Inventors: Alexander Benjamin Graves, London (GB); Ivo Danihelka, London (GB); Gregory Duncan Wayne, London (GB)

(73) Assignee: DeepMind Technologies Limited, London (GB)

( * ) Notice: Subject to any disclaimer, the term of this patent is extended or adjusted under 35 U.S.C. 154(b) by 135 days.

This patent is subject to a terminal disclaimer.

(21) Appl. No.: 16/831,566

(22) Filed: Mar. 26, 2020

(65) Prior Publication Data

US 2020/0226446 A1 Jul. 16, 2020

Related U.S. Application Data

(63) Continuation of application No. 14/885,086, filed on Oct. 16, 2015, now Pat. No. 10,650,302.

(Continued)

(51) Int. Cl.
*G06N 3/04* (2006.01)
*G06N 3/08* (2006.01)

(52) U.S. Cl.
CPC ............... *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS 5,167,006 A 11/1992 Furuta
5,406,508 A 4/1995 Hayashibara
(Continued)

FOREIGN PATENT DOCUMENTS

CN 101460941 6/2009

OTHER PUBLICATIONS

Bahdanau et al., "Neural machine translation by jointly learning to align and translate," arXiv:1409,0473, Apr. 2015, pp. 1-15.

(Continued)

*Primary Examiner* — Li B. Zhen
*Assistant Examiner* — Markus A. Vasquez
(74) *Attorney, Agent, or Firm* — Fish & Richardson P.C.

(57) ABSTRACT

Methods, systems, and apparatus, including computer programs encoded on computer storage media, for augmenting neural networks with an external memory. One of the methods includes providing an output derived from a first portion of a neural network output as a system output; determining one or more sets of writing weights for each of a plurality of locations in an external memory; writing data defined by a third portion of the neural network output to the external memory in accordance with the sets of writing weights; determining one or more sets of reading weights for each of the plurality of locations in the external memory from a fourth portion of the neural network output; reading data from the external memory in accordance with the sets of reading weights; and combining the data read from the external memory with a next system input to generate the next neural network input.

20 Claims, 8 Drawing Sheets

Related U.S. Application Data

(60) Provisional application No. 62/064,965, filed on Oct. 16, 2014.

(56) References Cited

U.S. PATENT DOCUMENTS

| | | | |
|---|---|---|---|
| 5,493,632 | A | 2/1996 | Ahn et al. |
| 7,440,968 | B1 | 10/2008 | Oztekin |
| 9,015,093 | B1 | 4/2015 | Commons |
| 9,569,132 | B2 | 2/2017 | Sadhukhan |

OTHER PUBLICATIONS

CN Office Action in Chinese Appln. 201580033184.4, dated Mar. 28, 2019, 7 pages (with English translation).

CN Office Action issued in Chinese Application No. 201580033184.4, dated Jul. 17, 2018, 15 pages (with English translation).

Das et al., "Learning context-free grammars: Capabilities and limitations of a recurrent neural network with an external stack memory," In Proceedings of the Fourteenth Annual Conference of Cognitive Science Society, pp. 791-795, 1992.

EP Office Action issued in European Application No. 15791075.3, dated Feb. 7, 2019, 7 pages.

EP Summons to attend oral proceedings pursuant to Rule 115(1) EPC in European Appln No. 15791075.3, dated Dec. 5, 2019, 8 pages.

Frasconi et al., "A general framework for adaptive processing of data structures," Neural Networks, IEEE Transactions on, 9(5):768-786, Sep. 1998.

Gers, Felix A., and E. Schnnidhuber. "LSTM recurrent networks learn simple context-free and context-sensitive languages." IEEE Transactions on Neural Networks 12.6 (2001): 1333-1340. (Year: 2001).

Graves and Jaitly, "Towards end-to-end speech recognition with recurrent neural networks," In Proceedings of the 31st International Conference on Machine Learning (ICML-14), pp. 1764-1772, 2014.

Graves et al., "Neural Turing Machines," arXiv:1410.5401 [cs.NE], Oct. 20, 2014, pp. 1-26.

Graves et al., "Speech recognition with deep recurrent neural networks," In Acoustics, Speech and Signal Processing (ICASSP), 2013 IEEE International Conference on, pp. 6645-6649, 2013.

Graves, "Generating sequences with recurrent neural networks," arXiv preprint arXiv:1308.0850, Jun. 2014, pp. 1-43.

Hochreiter et al., "Gradient flow in recurrent nets: the difficulty of learning long-term dependencies," A Field Guide to Dynamical Recurrent Neural Networks, IEEE Press, 2001, pp. 1-15.

Hopfield, "Neural networks and physical systems with emergent collective computational abilities," Proceedings of the national academy of sciences, 79(8):2554-2558, Apr. 1982.

International Preliminary Report on Patentability in International Application No. PCT/US2015/055817, dated Apr. 18, 2017, 9 pages.

International Search Report and Written Opinion in International Application No. PCT/US2015/055817, dated Jan. 25, 2016, 14 pages.

Siegelmann and Sontag, "On the computational power of neural nets," Journal of computer and system sciences, 50(1):132-150, 1995.

Sutskever et al., "Sequence to sequence learning with neural networks," arXiv preprint arXiv:1409,3215, 2014, pp. 1-9.

Turing, "On computable numbers with an application to the Entscheidungsproblem," Proc. London Math, Soc. (2), 42, pp. 230-265, Nov. 1936.

Weston et al., "Memory Networks," arXiv:1410.3916 [cs.AI], Oct. 15, 2014, pp. 1-9.

AUGMENTING NEURAL NETWORKS WITH EXTERNAL MEMORY

CROSS-REFERENCE TO RELATED APPLICATION

This application is a continuation application of and claims priority to U.S. application Ser. No. 14/885,086, filed on Oct. 16, 2015, which claims priority to U.S. Provisional Application No. 62/064,965, filed on Oct. 16, 2014. The disclosure of each application is considered part of and is incorporated by reference in the disclosure of this application.

BACKGROUND

This specification relates to neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from processing a previous input in computing a current output. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies that relate to augmented neural network systems. In general, an augmented neural network system includes a neural network configured to receive a neural network input and generate a neural network output, an external memory that stores values derived from portions of the neural network output, and a memory interface subsystem that is configured to receive portions of the neural network output and erase, write, and read from the external memory using the received portions.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. By augmenting a neural network with an external memory, the augmented neural network can more accurately generate outputs from received inputs for a variety of machine learning tasks. In particular, in order to facilitate processing of a given input from a sequence of inputs, the augmented neural network can effectively use information generated by the augmented neural network during processing of many preceding inputs in the sequence by reading from the external memory. Similarly, in order to facilitate processing of subsequent inputs from the sequence, the augmented neural network can store information generated during processing of the current input in the external memory. Additionally, the size of the external memory can be increased without increasing the number of trainable parameters of the augmented neural network. Further, the augmented neural network can access the external memory using both content and location-based lookups. Additionally, the augmented neural network can make use of long-term memory storage with less interference between consecutive writes. Furthermore, because the entire external memory is differentiable, the augmented neural network system can be trained efficiently.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
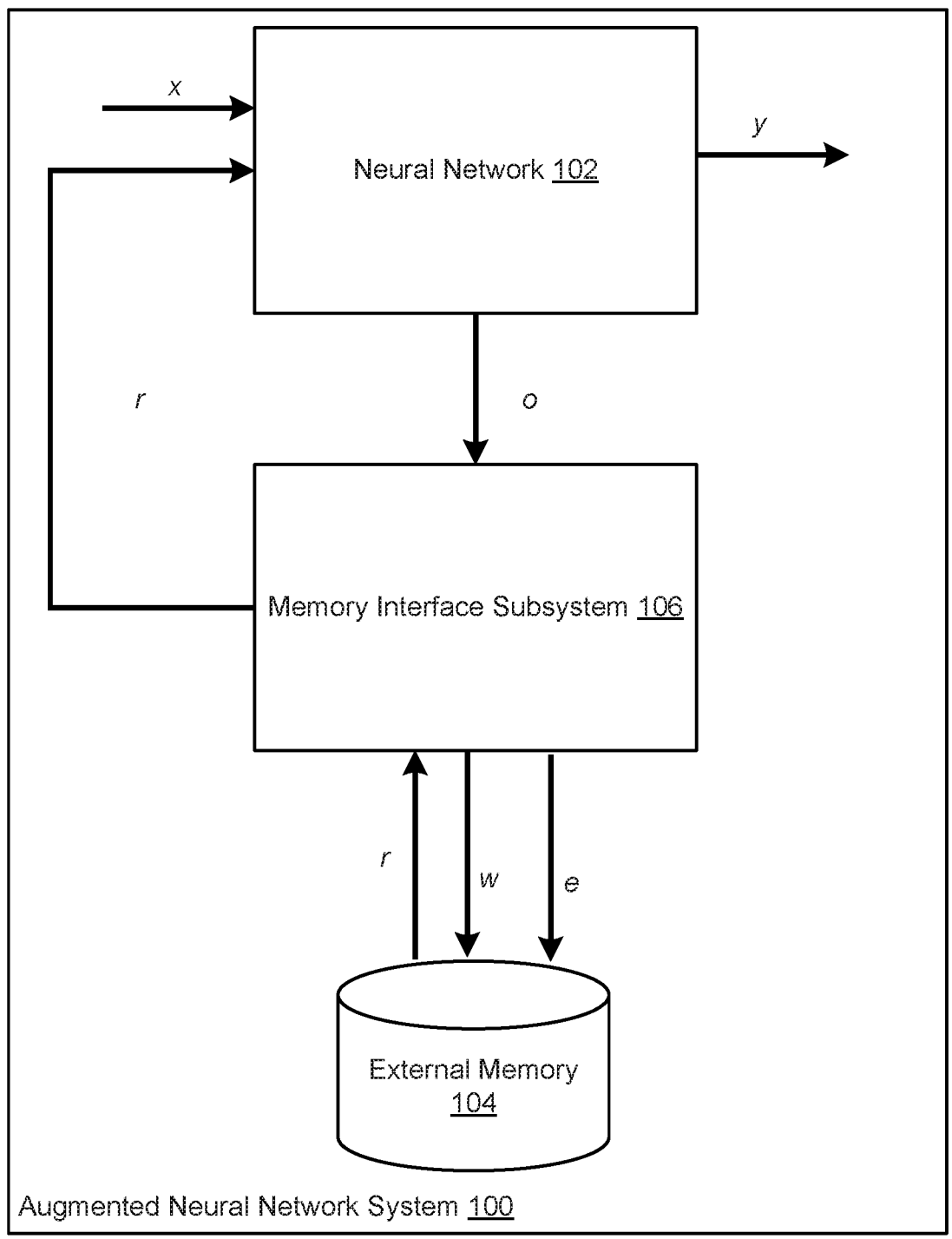
FIG. 1 shows an example augmented neural network system.

FIG. 1 shows an example augmented neural network system 100. The augmented neural network system 100 is an example of a system implemented as computer programs on one or more computers in one or more locations, in which the systems, components, and techniques described below are implemented.

The augmented neural network system 100 is a machine learning system that receives a sequence of system inputs and generates a sequence of system outputs from the system inputs. For example, the augmented neural network system 100 can receive a system input x as part of an input sequence and generate a system output y from the system input x. The augmented neural network system 100 can store the generated sequence of outputs in an output data repository or provide the output for use for some other immediate purpose.

The augmented neural network system 100 can be configured to receive any kind of digital data input and to generate any kind of score or classification output based on the input.

For example, if the inputs to the augmented neural network system 100 are images or features that have been extracted from images, the output generated by the augmented neural network system 100 for a given image may be scores for each of a set of object categories, with each score representing an estimated likelihood that the image contains an image of an object belonging to the category.

As another example, if the inputs to the augmented neural network system 100 are Internet resources (e.g., web pages), documents, or portions of documents or features extracted from Internet resources, documents, or portions of documents, the output generated by the augmented neural network system 100 for a given Internet resource, document, or portion of a document may be a score for each of a set of topics, with each score representing an estimated likelihood that the Internet resource, document, or document portion is about the topic.

As another example, if the inputs to the augmented neural network system 100 are features of an impression context for a particular advertisement, the output generated by the augmented neural network system 100 may be a score that represents an estimated likelihood that the particular advertisement will be clicked on.

As another example, if the inputs to the augmented neural network system 100 are features of a personalized recommendation for a user, e.g., features characterizing the context for the recommendation, e.g., features characterizing previous actions taken by the user, the output generated by the augmented neural network system 100 may be a score for each of a set of content items, with each score representing an estimated likelihood that the user will respond favorably to being recommended the content item.

As another example, if the input to the augmented neural network system 100 is text in one language, the output generated by the augmented neural network system 100 may be a score for each of a set of pieces of text in another language, with each score representing an estimated likelihood that the piece of text in the other language is a proper translation of the input text into the other language.

As another example, if the input to the augmented neural network system 100 is a spoken utterance, a sequence of spoken utterances, or features derived from one of the two, the output generated by the augmented neural network system 100 may be a score for each of a set of pieces of text, each score representing an estimated likelihood that the piece of text is the correct transcript for the utterance or sequence of utterances.

As another example, the augmented neural network system 100 can be part of a speech synthesis system.

As another example, the augmented neural network system 100 can be part of a video processing system.

As another example, the augmented neural network system 100 can be part of a dialogue system.

As another example, the augmented neural network system 100 can be part of an autocompletion system.

As another example, the augmented neural network system 100 can be part of a text processing system.

As another example, the augmented neural network system 100 can be part of a reinforcement learning system.

In particular, the augmented neural network system 100 includes a neural network 102 and an external memory 104. The neural network 102 may be a feedforward neural network or a recurrent neural network that is configured to receive a neural network input and process the neural network input to generate a neural network output. Generally, the neural network input received by the neural network 102 is a combination of the current system input and data read from the external memory by a memory interface subsystem 106. For example, the neural network 102 may be configured to receive the current system input x and data r read from the external memory 104 and to generate a neural network output that includes the system output y and additional output o that is provided to the memory interface subsystem 106.

The memory interface subsystem 106 receives outputs generated by the neural network, e.g., the portion o of the neural network output o+y (with the + signifying concatenation), and translates the received outputs into erase, read, and write operations to be performed on the external memory 104. That is, the memory interface subsystem 106 receives an output o from the neural network 102 and, based on the output o, erases data e from the external memory 104, writes data w to the external memory 104, and reads data r from the external memory 104. The data read by the memory interface subsystem 106 can then be provided to the neural network 102 as a portion of a later neural network input, e.g., along with a system input.

The external memory 104 stores data vectors written to the external memory 104 by the memory interface subsystem 106. In some implementations, the external memory 104 is a real-valued matrix memory that has elements $M(i,j,t)$, where i indexes location, j indexes the vector element, and t indexes time. Thus, $M(i,j,t)$ would be the value stored at element j of the vector stored at location i in the external memory 104 at time t. By configuring the external memory 104, the memory interface subsystem 106, and the neural network 102 in this manner, the components of the augmented neural network system 100 are entirely differentiable, allowing the augmented neural network system 100 to be effectively trained.

Figure 2:
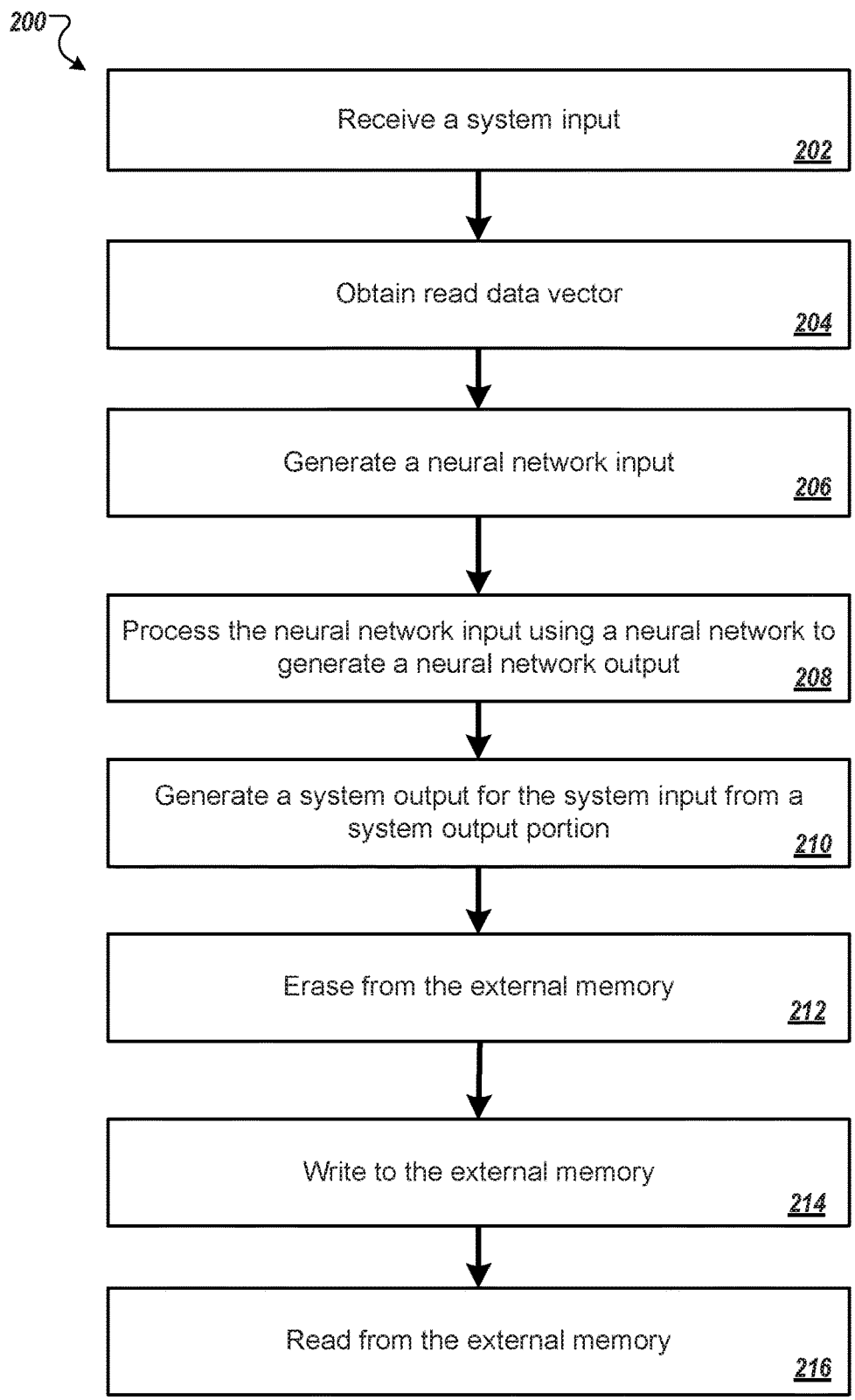
FIG. 2 is a flow diagram of an example process for generating a system output from a system input.

FIG. 2 is a flow diagram of an example process 200 for generating a system output from a system input. For convenience, the process 200 will be described as being performed by a system of one or more computers located in one or more locations. For example, an augmented neural network system, e.g., the augmented neural network system 100 of FIG. 1, appropriately programmed in accordance with this specification, can perform the process 200.

The system receives a system input (step 202). The system input is one of a sequence of system inputs received by the system.

The system obtains a read data vector generated by reading from an external memory (step 204), e.g., the external memory 104 of FIG. 1. Generally, the read data vector was generated by the system by reading from the external memory during processing of the preceding input in the sequence of system inputs.

The system generates a neural network input by combining the system input and the data read from the external memory (step 206). For example, the system can concatenate the system input and the read data vector to generate the neural network input. For the first system input, the system can concatenate the system input with a pre-determined vector, e.g., a learned state of the neural network.

The system processes the neural network input using a neural network, e.g., the neural network 102 of FIG. 1, to generate a neural network output from the neural network input (step 208). Depending on the implementation, the neural network can either be a feed-forward neural network, e.g., a convolutional neural network or another kind of deep feed-forward neural network, or a recurrent neural network, e.g., an LSTM neural network. If the neural network is a recurrent neural network, the recurrent neural network also uses the internal state of the recurrent neural network from the preceding neural network input in the sequence in processing the current neural network input to generate the neural network output. In some implementations, the neural network includes both recurrent and feed-forward layers.

The system generates a system output for the system input from a system output portion of the neural network output (step 210). The system output portion of the neural network output is a predetermined portion of the neural network output that has been designated, e.g., by a system administrator, as the portion to be used to generate the system output, i.e., so that the same portion of the neural network output is used to generate the system output for each output generated by the neural network.

In some implementations, the system provides the system output portion as the system output for the system input. In some other implementations, however, the system applies one or more transformations to the system output portion in order to generate the system output. For example, the system output portion may be transformed into a command to control a robot or a different digital interface.

The system erases from the external memory using an erase portion of the neural network output (step 212). The erase portion of the neural network output is a predetermined portion of the neural network output that has been designated as the portion to be used in erasing from the external memory. In particular, in order to erase from the external memory, the system determines erasing weights using the erase portion of the neural network output. The erasing weights are memory access weights that include a respective weight for each location in the external memory and that define a distribution over the locations in the external memory.

The system then erases from each location in the external memory in accordance with the erasing weights. Determining memory access weights, e.g., erasing weights, from a designated portion of a neural network output is described in more detail below with reference to FIG. 3. Erasing from the external memory in accordance with the erasing weights is described in more detail below with reference to FIG. 6.

The system writes to the external memory using a write portion of the neural network output (step 214). The write portion of the neural network output is a predetermined portion of the neural network output that has been designated as the portion to be used in writing to the external memory.

In particular, in order to write to the external memory, the system determines writing weights using a designated subportion of the write portion of the neural network output. In some implementations, the writing weights are the same as the erasing weights, i.e., the designated subportion of the write portion is the erase portion of the neural network output. In some other implementations, however, the designated subportion of the write portion is different from the erase portion. Determining memory access weights, e.g., writing weights, from a designated portion of a neural network output is described in more detail below with reference to FIG. 3.

The system also determines a write vector to be written to the external memory from a different designated subportion of the write portion and then writes the write vector to the external memory in accordance with the writing weights. Determining the write vector and writing the write vector to the external memory is described below with reference to FIG. 7.

The system reads from the external memory using a read portion of the neural network output (step 216). The read portion of the neural network output is a predetermined portion of the neural network output that has been designated as the portion to be used in reading from the external memory.

In particular, in order to read from the external memory, the system determines reading weights using the read portion of the neural network output and then reads from the locations in the external memory in accordance with the reading weights. Determining memory access weights, e.g., reading weights, from a designated portion of a neural network output is described in more detail below with reference to FIG. 3. Reading from the external memory is described below with reference to FIG. 8.

In some implementations, the system performs multiple erase, read, and write operations for a given system input. For example, the system can perform multiple sets that each include an erase operation, a read operation, and a write operation in parallel and independently of each other set of the operations. Additionally, as will be described in more detail below with reference to FIGS. 6-8, the system can use different memory access weights in performing each set of operations, e.g., because the system uses a different portion of the neural network output in computing each of the sets of memory access weights.

Additionally, the system can perform the erase, read, and write operations in any order. For example, in some implementations, the system erases, then writes, and then reads from the external memory. However, in other implementations, the system can perform these operations in a different order.

The process 200 can be performed for each system input in a sequence of system inputs to generate a sequence of system outputs for the sequence of system inputs. The sequence of system inputs can be a sequence for which the desired output, i.e., the output sequence that should be generated by the system for the input sequence, is not known. The system can also perform the process 200 on inputs in a set of training data, i.e., a set of inputs for which the output that should be predicted by the system is known, in order to train the system, i.e., to determine trained values for the parameters of the neural network and any additional parameters of processes used in erasing, writing, and reading from the external memory. Because the components of the system are entirely differentiable, the process 200 can be performed repeatedly on inputs selected from a set of training data as part of a conventional machine learning training technique to train the neural network, e.g., a stochastic gradient descent backpropagation through time training technique if the neural network is a recurrent neural network.

Figure 3:
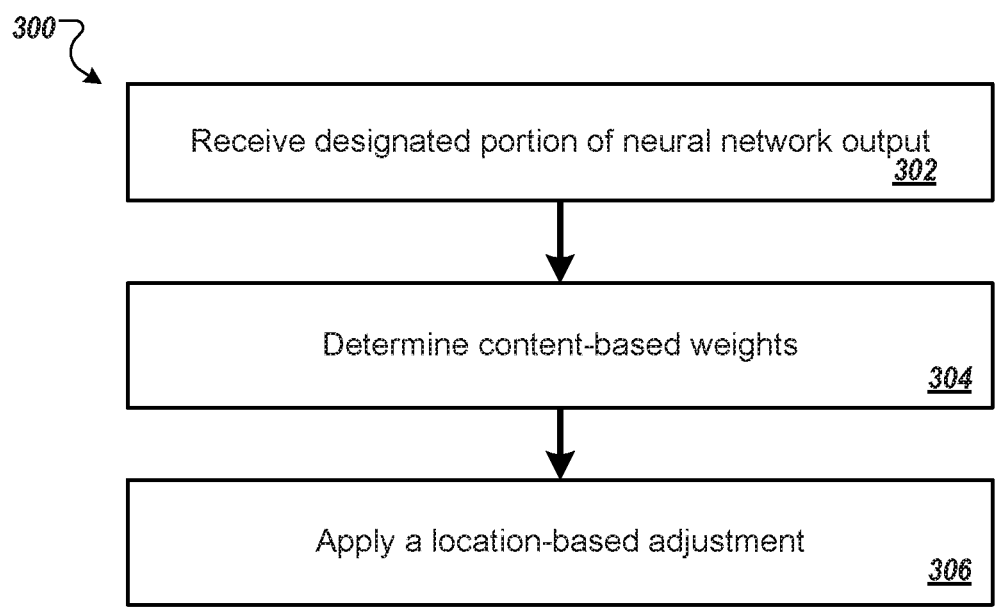
FIG. 3 is a flow diagram of an example process for determining memory access weights from a designated portion of a neural network output.

FIG. 3 is a flow diagram of an example process 300 for determining memory access weights from a designated portion of a neural network output. For convenience, the process 300 will be described as being performed by a system of one or more computers located in one or more locations. For example, an augmented neural network system, e.g., the augmented neural network system 100 of FIG. 1, appropriately programmed in accordance with this specification, can perform the process 300.

The system receives a designated portion of a neural network output (step 302). That is, if the memory access weights being determined by the system are erasing weights, the system receives the erasing portion of the neural network output, if the memory access weights being determined by the system are writing weights, the system receives the designated subportion of the write portion of the neural network output, and if the memory access weights being determined by the system are reading weights, the system receives the reading portion of the neural network output.

The system determines content-based weights from a content-based subportion of the designated portion (step 304). Generally, in order to determine the content-based weights, the system determines a content key vector from the content-based subportion. The system then compares the content key vector to the vectors stored in the locations in the external memory in order to determine the weights for the locations. Determining the content-based weights is described in more detail below with reference to FIG. 4.

The system applies a location-based adjustment to the content-based weights to determine the memory access weights (step 306). Generally, the system determines a shift vector from a location-based subportion of the designated portion and then uses the shift vector to adjust the content-based weights in order to determine the memory access weights. Adjusting the content-based weights is described below with reference to FIG. 5.

Figure 4:
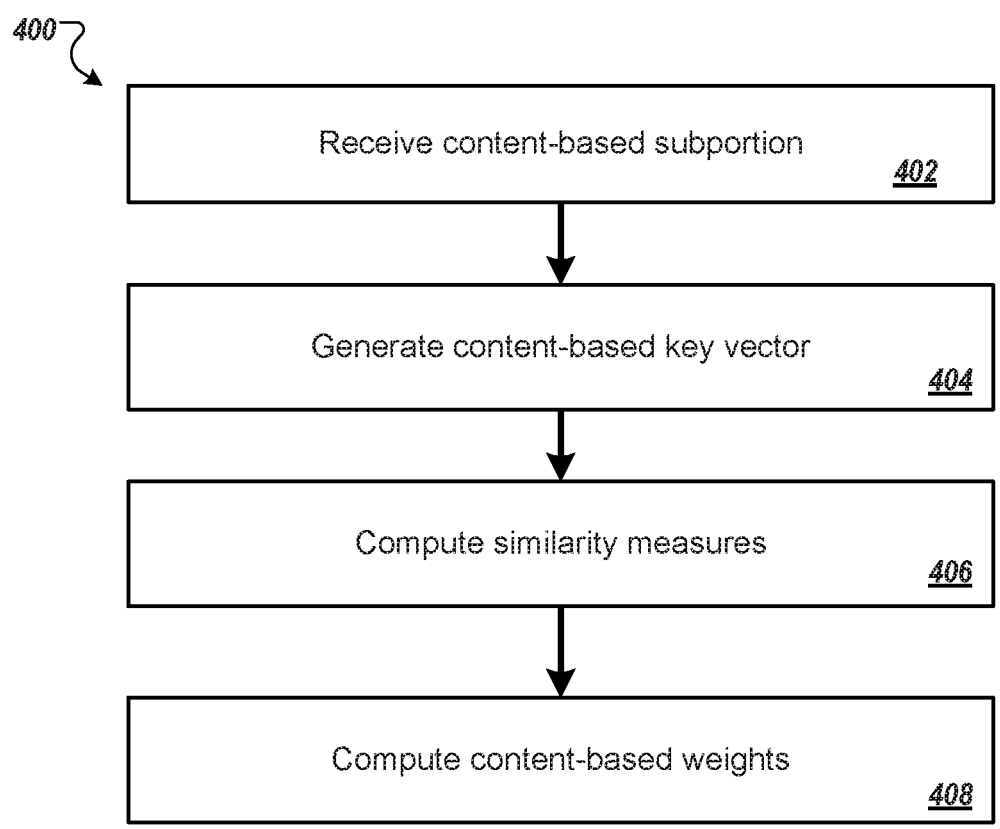
FIG. 4 is a flow diagram of an example process for generating content-based weights for locations in an external memory.

FIG. 4 is a flow diagram of an example process 400 for generating content-based weights for locations in an external memory. For convenience, the process 400 will be described as being performed by a system of one or more computers located in one or more locations. For example, an augmented neural network system, e.g., the augmented neural network system 100 of FIG. 1, appropriately programmed in accordance with this specification, can perform the process 400.

The system receives a content-based subportion of a designated portion of the neural network output (step 402).

The system generates a content-based key vector from the content-based subportion (step 404). In some implementations, the system may use the content-based subportion as the content-based key vector. In some other implementations, the system applies one or more transformations to the content-based subportion in order to generate the content-based key vector. For example, the system may process the content-based subportion using a neural network, e.g., a multilayer perceptron (MLP) neural network, that is configured to receive the subportion and generate the content-based key vector.

The system computes similarity measures between the content-based key vector and the vectors stored in the external memory (step 406). That is, the system computes a respective similarity measure between the content-based key vector and each vector stored in the external memory. For example, the similarity measure may be a cosine similarity measure, with the similarity K between the content-based key vector k(h,t) and a given vector M(i,•,t) located at the i-th location in the external memory M satisfying:

$$K(k(h, t), M(i, \bullet, t)) = \frac{k(h, t) \bullet M(i, \bullet, t)}{\|k(h, t)\| \|M(i, \bullet, t)\|}.$$

The system computes the content-based weights for the locations in the external memory using the similarity measures (step 406). Generally, the system computes the weights so that locations that have higher similarity measures with the content-based key vector are assigned higher weights. For example, the content-based weight for the i-th location in the external memory M may satisfy:

$$w_c(i, h, t) = \frac{\exp(\beta(h, t) K(k(h, t), M(i, \bullet, t)))}{\sum_{i'} \exp(\beta(h, t) K(k(h, t), M(i', \bullet, t)))},$$

where ß(h,t) is a "key strength" value that is a positive value derived from a designated portion of the neural network output and the sum is a sum over all of the locations in the external memory.

Figure 5:
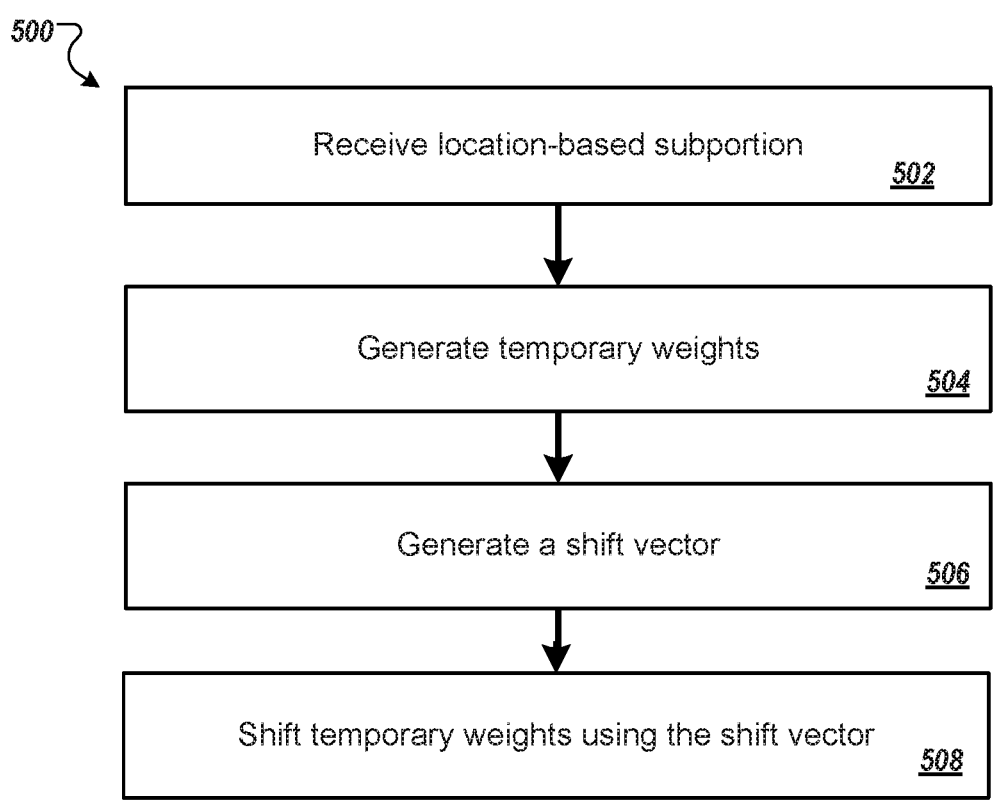
FIG. 5 is a flow diagram of an example process for applying a location-based adjustment to content-based weights.

FIG. 5 is a flow diagram of an example process 500 for applying a location-based adjustment to content-based weights. For convenience, the process 500 will be described as being performed by a system of one or more computers located in one or more locations. For example, an augmented neural network system, e.g., the augmented neural network system 100 of FIG. 1, appropriately programmed in accordance with this specification, can perform the process 500.

The system receives a location-based subportion of a designated portion of the neural network output (step 502).

The system generates temporary weights from the content-based weights and the preceding weights generated by the system (step 504). Generally, the previous weights generated by the system are the memory access weights generated by the system during processing of the preceding system input. The system generates the temporary weights by combining the content-based weights and the preceding weights. For example, the temporary weights may be an interpolation of the content-based weights and the preceding weights, with the temporary weights $\tilde{w}(i,h,t+1)$ for a given location i in the external memory for a t+1-th system input satisfying:

$$\tilde{w}(i,h,t+1) = (1 - g_i(h,t+1)) w_c(i,h,t+1) + g_i(h,t+1) w(i,h,t),$$

where $g_i(h,t+1)$ is a gate output that is between zero and one is and is derived from a designated portion of the neural network output, $w_c(i,h,t+1)$ are the content-based weights for the t+1-th system input, and w(i,h,t) are the memory access weights from the t-th system input.

The system generates a shift vector from the location-based subportion (step 506). In some implementations, the system may use the location-based subportion as the shift vector. In some other implementations, the system applies one or more transformations to the location-based subportion in order to generate the shift vector. For example, the system may process the location-based subportion using a neural network, e.g., an MLP neural network, that is configured to receive the subportion and generate the shift vector.

The system shifts the temporary weights using the shift vector to generate the memory access weights (step 508). In particular, the system applies a convolution, e.g., a circular convolution, to the temporary weights using the shift vector to generate the memory access weights. For example, the weight w(i,h,t+1) for the location i in the external memory may satisfy:

$$w(i, h, t+1) = \sum_{j=0}^{N-1} \tilde{w}(j, h, t+1) s(i-j, h, t+1),$$

where all index arithmetic is computed modulo N, and where s(i−j,h,t+1) is the shift vector for location i−j in the memory.

Figure 6:
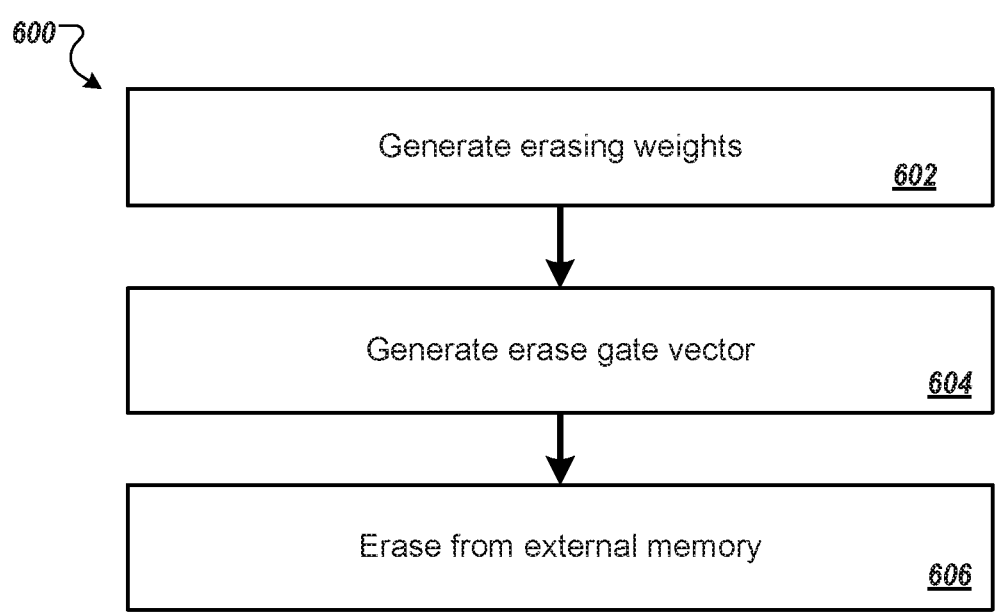
FIG. 6 is a flow diagram of an example process for erasing from an external memory in accordance with erasing weights.

FIG. 6 is a flow diagram of an example process 600 for erasing from an external memory in accordance with erasing weights. For convenience, the process 600 will be described as being performed by a system of one or more computers located in one or more locations. For example, an augmented neural network system, e.g., the augmented neural network system 100 of FIG. 1, appropriately programmed in accordance with this specification, can perform the process 600.

The system generates erasing weights (step 602). The system can generate the erasing weights as described above with reference to FIGS. 3-5.

The system generates an erase vector (step 604). In some implementations, the system may use a designated portion of the neural network output as the erase vector. In some other implementations, the system applies one or more transformations to the portion in order to generate the erase vector. For example, the system may process the portion using a neural network, e.g., a multilayer perceptron (MLP) neural network, that is configured to receive the portion and generate the erase vector.

The system erases from the external memory using the erasing weights and the erase gate vector (step 606). In particular, for a value M(i,j,t) stored at vector element j of a vector stored at location i in the external memory, the system generates an erased value $\tilde{M}(i,j,t+1)$ that satisfies:

$$\tilde{M}(i, j, t+1) = M(i, j, t) \prod_{h=1}^{H} (1 - w_e(i, h, t+1) g_e(j, h, t+1)),$$

where $w_e(i,h,t+1)$ is the erasing weight for the location i and $g_e(j,h,t+1)$ is the erase vector.

In implementations where the system performs multiple erase operations for a given system input, e.g., in parallel as described above, each erase operation can be performed independently by performing the technique 600 with optionally different values for the erasing weights and the erase gate vectors. For example, each erase operation can be performed by using a different neural network with possibly different parameter values to generate the erase gate vector. Thus, the cumulative effect of the multiple erase operations being performed in parallel is multiplicative.

Figure 7:
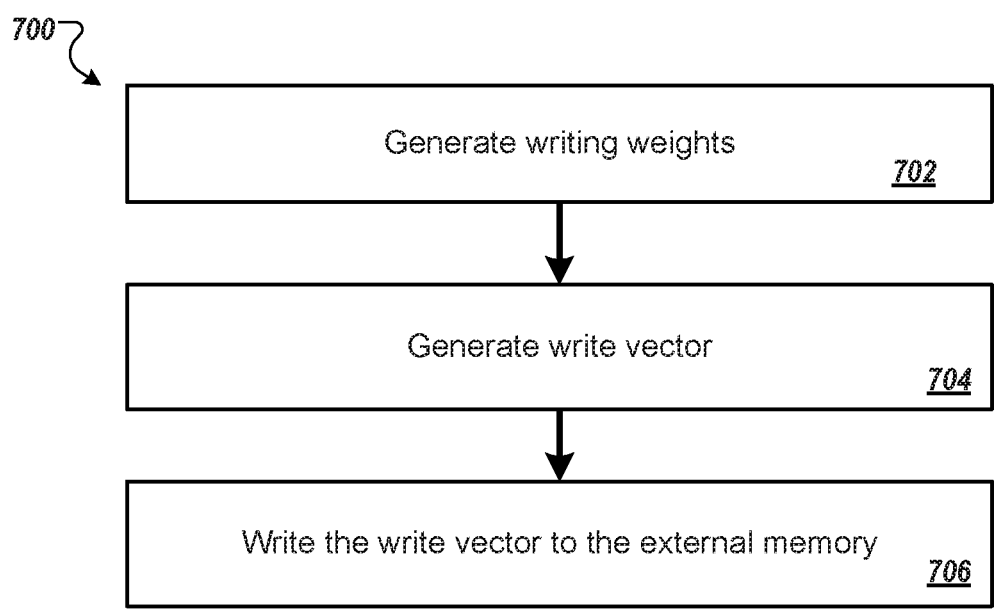
FIG. 7 is a flow diagram of an example process for writing to an external memory in accordance with writing weights.

FIG. 7 is a flow diagram of an example process 700 for writing to an external memory in accordance with writing weights. For convenience, the process 700 will be described as being performed by a system of one or more computers located in one or more locations. For example, an augmented neural network system, e.g., the augmented neural network system 100 of FIG. 1, appropriately programmed in accordance with this specification, can perform the process 700.

The system generates writing weights (step 702). The system can generate the writing weights from a designated subportion of the writing output portion as described above with reference to FIGS. 3-5. As described above, in some implementations, the writing weights are the same as the erasing weights.

The system generates a write vector from a different designated portion of the writing output portion (step 704). In some implementations, the system may use the different designated subportion as the write vector. In some other implementations, the system applies one or more transformations to the different designated subportion in order to generate the write vector. For example, the system may process the different designated subportion using a neural network, e.g., an MLP neural network, that is configured to receive the subportion and generate the write vector.

The system writes the write vector to the external memory using the writing weights (step 706). In particular, for a value M(i,j,t) stored at vector element j of a vector stored at location i in the external memory, the system generates a value M(i,j,t+1) that satisfies:

$$\tilde{M}(i, j, t+1) = M(i, j, t) + \sum_{h=1}^{H} w_w(i, h, t+1) v(j, h, t+1)),$$

where $w_w(i,h,t+1)$ is the writing weight for the location i and $v(j,h,t+1)$ is the value at element h of the write vector. In implementations where the write operation is performed after the erase operation, rather than modifying a value $\tilde{M}(i,j,t)$, the system can generate the value M(i,j,t+1) by modifying the value $\tilde{M}(i,j,t+1)$ generated by the erasing operation described above.

In implementations where the system performs multiple write operations for a given system input, e.g., in parallel as described above, each write operation can be performed independently by performing the technique 700 with optionally different values for the writing weights and the write vectors. For example, each write operation can be performed by using a different neural network with possibly different parameter values to generate the write vector. Thus, the cumulative effect of the multiple write operations being performed in parallel is additive.

Figure 8:
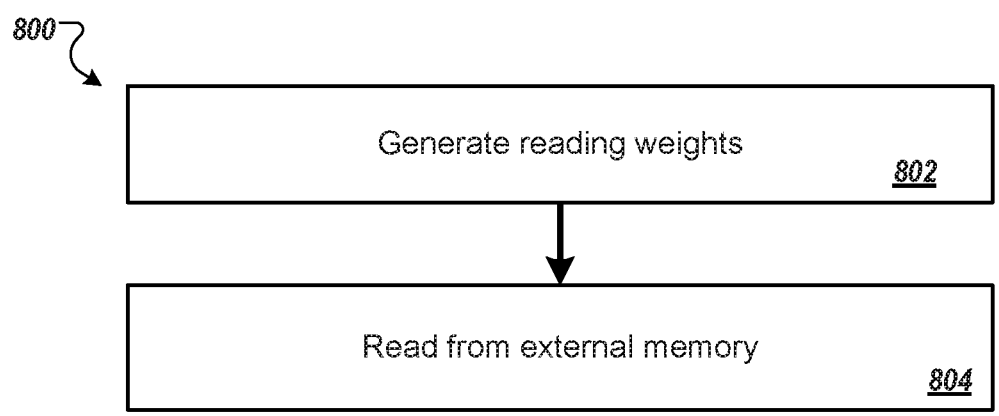
FIG. 8 is a flow diagram of an example process for reading from an external memory in accordance with reading weights.

FIG. 8 is a flow diagram of an example process 800 for reading from an external memory in accordance with reading weights. For convenience, the process 800 will be described as being performed by a system of one or more computers located in one or more locations. For example, an augmented neural network system, e.g., the augmented neural network system 100 of FIG. 1, appropriately programmed in accordance with this specification, can perform the process 800.

The system generates reading weights (step 802). The system can generate the reading weights from the reading output portion as described above with reference to FIGS. 3-5.

The system reads from locations in the external memory in accordance with the reading weights (step 804). In particular, the system generates a read data vector by combining the value stored at each location in the external memory. That is, for a given element of the read data vector, the system computes a weighted average of each value stored in the external memory at that element, with the weight for each value being the reading weight for the corresponding location. For example, the value of the read vector at element j r(j,h,t+1) may satisfy:

$$r(j, h, t+1) = \sum_{i=0}^{N-1} w_r(i, h, t+1) M(i, j, t+1)),$$

where $w_r(i,h,t+1)$ is the reading weight for the location i and M(i,j,t+1) is the value at element j of the vector stored at location i in the memory.

In implementations where the system performs multiple read operations for a given system input, e.g., in parallel as described above, each read operation can be performed independently by performing the technique 800 with optionally different values for the reading weights. In these implementations, the system can combine the read data vectors generated by each read operation, e.g., by concatenating the vectors, to form a final read data vector that is provided as part of the neural network input to the neural network.

Depending on the implementation, the system can maintain various degrees of persistence of the data stored in the external memory based on outputs received from the neural network. For example, in some implementations, the system re-sets the external memory after each sequence of system inputs has been fully processed by the system. As another example, in some implementations, the data stored in the external memory persists between input sequences. That is, the system does not delete any data from the external memory between sequences of system inputs. In these implementations, the system may re-set the external memory after a given task assigned to the system is completed and before the system begins a different machine learning task. Alternatively, the system may maintain the external memory without deleting values even between tasks. Thus, while processing a current input sequence, the system may be able to leverage data stored in the memory while processing a previous input sequence or even while performing a previous machine learning task.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for processing a sequence of system inputs to generate a sequence of system outputs using an augmented neural network system comprising a neural network and an external memory, wherein the neural network is configured to receive a sequence of neural network inputs and to process each neural network input to generate a neural network output from the neural network input, wherein the external memory is external to the neural network and is configured to store a respective value vector in each of a plurality of locations in the external memory, and wherein the method comprises, for each neural network output:
   providing an output derived from a first portion of the neural network output as a system output in the sequence of system outputs;
   determining one or more sets of writing weights for each of the plurality of locations in the external memory from a second portion of the neural network output, wherein the second portion includes a content-based subportion, and wherein determining each of the one or more sets of writing weights comprises:
      for each of the plurality of locations in the external memory:
         computing a similarity measure between (i) a key vector derived from the content-based subportion and (ii) a respective value vector stored in the location, and
         determining a respective content-based writing weight based on the computed similarity measure, and
      adjusting the content-based writing weights using preceding writing weights assigned to the plurality of locations to generate the one or more sets of writing weights;
   writing data defined by a third portion of the neural network output to the external memory in accordance with the sets of writing weights;
   determining one or more sets of reading weights for each of the plurality of locations in the external memory from a fourth portion of the neural network output;
   reading data from the external memory in accordance with the sets of reading weights; and
   combining the data read from the external memory with a next system input in the sequence of system inputs to generate a next neural network input in the sequence of neural network inputs.

2. The method of claim 1, further comprising, for each of the neural network outputs:
   determining one or more sets of erasing weights for each of the plurality of locations in the external memory from a fifth portion of the neural network output; and
   erasing data from the external memory in accordance with the sets of erasing weights.

3. The method of claim 2, wherein the sets of erasing weights are the same as the sets of writing weights and the second portion is the same as the fifth portion.

4. The method of claim 1, wherein determining each of the one or more sets of writing weights further comprises:
   determining a set of location-based writing weights; and
   adjusting the content-based writing weights using the location-based writing weights to generate the one or more sets of writing weights.

5. The method of claim 1, wherein determining each of the one or more sets of reading weights comprises:
   determining a set of content-based reading weights from the fourth portion of the neural network output.

6. The method of claim 5, wherein determining each of the one or more sets of reading weights further comprises:
   determining a set of location-based reading weights; and
   adjusting the content-based reading weights using the location-based reading weights to generate the set of reading weights.

7. The method of claim 1, wherein reading data from the external memory in accordance with the sets of reading weights comprises, for each set of reading weights:
   determining a weighted average of values stored in the plurality of locations in the external memory in accordance with the reading weights in the set of reading weights.

8. The method of claim 1, wherein writing data defined by the third portion of the neural network output to the external memory in accordance with the sets of writing weights comprises, for each of the sets of writing weights:
   determining, from the third portion of the neural network output, a write vector for the set of writing weights; and
   writing the write vector to the plurality of locations in accordance with the set of writing weights.

9. One or more non-transitory computer storage media storing instructions that, when executed by one or more computers, cause the one or more computers to perform operations for processing a sequence of system inputs to generate a sequence of system outputs using an augmented neural network system comprising a neural network and an external memory, wherein the neural network is configured to receive a sequence of neural network inputs and to process each neural network input to generate a neural network output from the neural network input, wherein the external memory is external to the neural network and is configured to store a respective value vector in each of a plurality of locations in the external memory, and wherein the operations comprise, for each neural network output:
   providing an output derived from a first portion of the neural network output as a system output in the sequence of system outputs;
   determining one or more sets of writing weights for each of the plurality of locations in the external memory from a second portion of the neural network output, wherein the second portion includes a content-based subportion, and wherein determining each of the one or more sets of writing weights comprises:
      for each of the plurality of locations in the external memory:
         computing a similarity measure between (i) a key vector derived from the content-based subportion and (ii) a respective value vector stored in the location, and
         determining a respective content-based writing weight based on the computed similarity measure, and
      adjusting the content-based writing weights using preceding writing weights assigned to the plurality of locations to generate the one or more sets of writing weights;
   writing data defined by a third portion of the neural network output to the external memory in accordance with the sets of writing weights;
   determining one or more sets of reading weights for each of the plurality of locations in the external memory from a fourth portion of the neural network output;
   reading data from the external memory in accordance with the sets of reading weights; and
   combining the data read from the external memory with a next system input in the sequence of system inputs to generate a next neural network input in the sequence of neural network inputs.

10. The one or more non-transitory computer storage media of claim 9, wherein the operations further comprises, for each of the neural network outputs:
   determining one or more sets of erasing weights for each of the plurality of locations in the external memory from a fifth portion of the neural network output; and
   erasing data from the external memory in accordance with the sets of erasing weights.

11. The one or more non-transitory computer storage media of claim 9, wherein the operations for determining each of the one or more sets of writing weights further comprises:
   determining a set of location-based writing weights; and
   adjusting the content-based writing weights using the location-based writing weights to generate the one or more sets of writing weights.

12. The one or more non-transitory computer storage media of claim 9, wherein the operations for determining each of the one or more sets of reading weights comprises:
   determining a set of content-based reading weights from the fourth portion of the neural network output.

13. The one or more non-transitory computer storage media of claim 12, wherein determining each of the one or more sets of reading weights further comprises:
   determining a set of location-based reading weights; and
   adjusting the content-based reading weights using the location-based reading weights to generate the set of reading weights.

14. A system comprising one or more computers and one or more non-transitory computer storage media storing instructions that, when executed by the one or more computers, cause the one or more computers to perform operations for processing a sequence of system inputs to generate a sequence of system outputs using an augmented neural network system comprising a neural network and an external memory, wherein the neural network is configured to receive a sequence of neural network inputs and to process each neural network input to generate a neural network output from the neural network input, wherein the external memory is external to the neural network and is configured to store a respective value vector in each of a plurality of locations in the external memory, and wherein the operations comprise, for each neural network output:
   providing an output derived from a first portion of the neural network output as a system output in the sequence of system outputs;
   determining one or more sets of writing weights for each of the plurality of locations in the external memory from a second portion of the neural network output, wherein the second portion includes a content-based subportion, and wherein determining each of the one or more sets of writing weights comprises:
      for each of the plurality of locations in the external memory:
         computing a similarity measure between (i) a key vector derived from the content-based subportion and (ii) a respective value vector stored in the location, and
         determining a respective content-based writing weight based on the computed similarity measure, and
      adjusting the content-based writing weights using preceding writing weights assigned to the plurality of locations to generate the one or more sets of writing weights;
   writing data defined by a third portion of the neural network output to the external memory in accordance with the sets of writing weights;

determining one or more sets of reading weights for each of the plurality of locations in the external memory from a fourth portion of the neural network output;

reading data from the external memory in accordance with the sets of reading weights; and combining the data read from the external memory with a next system input in the sequence of system inputs to generate a next neural network input in the sequence of neural network inputs.

15. The system of claim 14, wherein the operations further comprise, for each of the neural network outputs:

determining one or more sets of erasing weights for each of the plurality of locations in the external memory from a fifth portion of the neural network output; and erasing data from the external memory in accordance with the sets of erasing weights.

16. The system of claim 14, wherein the operations for determining each of the one or more sets of writing weights further comprises:

determining a set of location-based writing weights; and adjusting the content-based writing weights using the location-based writing weights to generate the one or more sets of writing weights.

17. The system of claim 14, wherein the operations for determining each of the one or more sets of reading weights comprises:

determining a set of content-based reading weights from the fourth portion of the neural network output.

18. The system of claim 17, wherein the operations for determining each of the one or more sets of reading weights further comprises:

determining a set of location-based reading weights; and adjusting the content-based reading weights using the location-based reading weights to generate the set of reading weights.

19. The system of claim 14, wherein the operations for reading data from the external memory in accordance with the sets of reading weights comprises, for each set of reading weights:

determining a weighted average of values stored in the plurality of locations in the external memory in accordance with the reading weights in the set of reading weights.

20. The system of claim 14, wherein the operations for writing data defined by the third portion of the neural network output to the external memory in accordance with the sets of writing weights comprises, for each of the sets of writing weights:

determining, from the third portion of the neural network output, a write vector for the set of writing weights; and writing the write vector to the plurality of locations in accordance with the set of writing weights.

* * * * *